(12) United States Patent
Hareuveni et al.

(10) Patent No.: US 10,064,180 B2
(45) Date of Patent: Aug. 28, 2018

(54) METHODS, SYSTEMS, AND DEVICES FOR DYNAMIC PACKET TRANSFER IN WIRELESS NETWORKS

(71) Applicant: Intel IP Corporation, Santa Clara, CA (US)

(72) Inventors: Ofer Hareuveni, Haifa (IL); Itzik Shahar, Kadima (IL)

(73) Assignee: Intel IP Corporation, Santa Clara, CA (US)

(*) Notice: Subject to any disclaimer, the term of this patent is extended or adjusted under 35 U.S.C. 154(b) by 148 days.

(21) Appl. No.: 14/671,228

(22) Filed: Mar. 27, 2015

(65) Prior Publication Data

US 2016/0286554 A1    Sep. 29, 2016

(51) Int. Cl.
*H04W 72/04* (2009.01)
*H04W 4/00* (2018.01)
*H04W 4/80* (2018.01)
*H04W 88/06* (2009.01)

(52) U.S. Cl.
CPC ........ *H04W 72/0453* (2013.01); *H04W 4/80* (2018.02); *H04W 88/06* (2013.01)

(58) Field of Classification Search
CPC .................. H04W 72/0453; H04W 4/008
See application file for complete search history.

(56) References Cited

U.S. PATENT DOCUMENTS

| 2008/0045152 A1* | 2/2008 | Boes | H04W 16/14 455/63.1 |
| 2016/0095142 A1* | 3/2016 | Chu | H04W 76/02 370/329 |
| 2016/0227350 A1* | 8/2016 | Zhang | H04L 61/6022 |

* cited by examiner

*Primary Examiner* — Luat Phung
(74) *Attorney, Agent, or Firm* — Eversheds Sutherland (US) LLP (57) ABSTRACT

Methods, devices and systems for dynamic scheduling Wi-Fi and Bluetooth signals are disclosed. In some examples, a wireless device may receive a transmission request for transmitting a Wi-Fi signal from a Wi-Fi device or interface, receive a transmission request for transmitting a Bluetooth signal from a Bluetooth device or interface, determine a delta between a frequency of the Wi-Fi signal and a frequency of the Bluetooth signal, and deny transmission of the Wi-Fi signal or the Bluetooth signal based, at least in part, on the delta determination.

20 Claims, 7 Drawing Sheets

METHODS, SYSTEMS, AND DEVICES FOR DYNAMIC PACKET TRANSFER IN WIRELESS NETWORKS

TECHNICAL FIELD

Exemplary and non-limiting embodiments disclosed herein relate generally to wireless communication systems, methods, devices and, more specifically, relate to packet transfer in wireless communication systems and devices.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), time division multiple access (TDMA), frequency division multiple access (FDMA) systems, 3GPP Long Term Evolution (LTE) systems, and orthogonal frequency division multiple access (OFDMA) systems.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) or fifth generation (5G) mobile phone. Such 4G or 5G phone may include various radios to provide a variety of functions for the user. For purposes of this example, the 4G or 5G phone includes an LTE radio for voice and data, an IEEE 802.11 (WiFi) radio, a Global Positioning System (GPS) radio, and a Bluetooth radio, where two or more of the above may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

Figure 1:
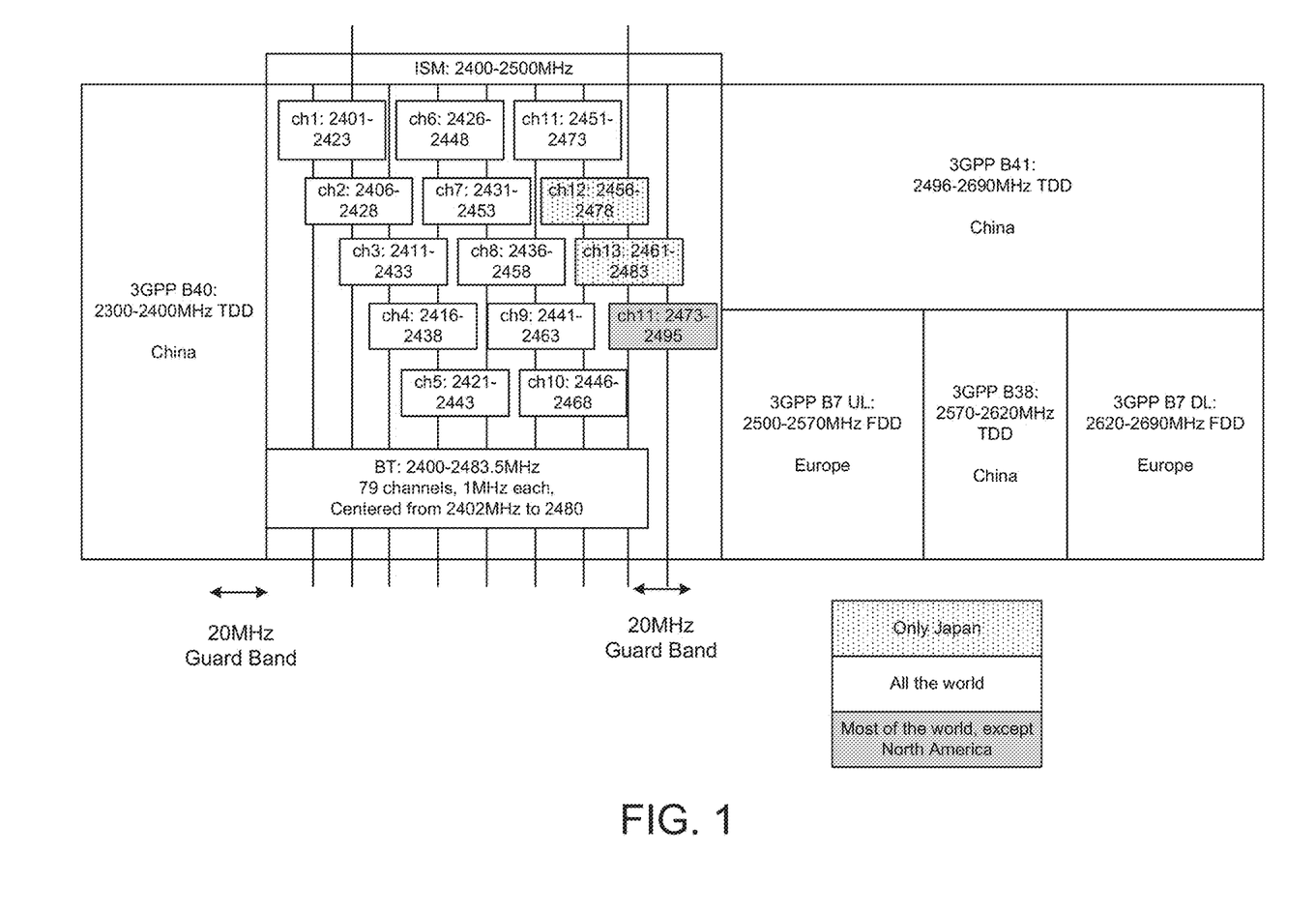
FIG. 1 illustrates an example of a Bluetooth band and an adjacent LTE band.

This is especially true for the LTE uplink channel, which is adjacent to the Industrial Scientific and Medical (ISM) band and may cause interference therewith. It should be noted that Bluetooth and some Wireless LAN (WLAN) channels fall within the ISM band, and FIG. 1, for example, illustrates a Bluetooth and an adjacent LTE band. Wi-Fi and Bluetooth both occupy a section of the 2.4 GHz ISM band that is 83 MHz-wide. Bluetooth uses Frequency Hopping Spread Spectrum (FHSS) and is allowed to hop between 79 different 1 MHz-wide channels in this band. In some instances, a Bluetooth error rate can become unacceptable when LTE is active in some channels of Band 40 or even Band 7 for some Bluetooth channel conditions. Consequently, simultaneous operation with Bluetooth can result in disruption in voice services terminating in a Bluetooth headset. Such disruption may be unacceptable to the consumer. In some instances, Bluetooth or WLAN error rate can become unacceptable when WLAN is active and the one of the plurality of hoping frequencies of the BT device is in proximity to the WLAN channel.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

A mobile device with multiple wireless transmitters may be using a pre-configured arbitration scheme to determine prioritization between requested transmissions. For example, such schemes for Wi-Fi and Bluetooth (BT) arbitrations may be defined by industry standards. Example embodiments disclosed herein provide for a system, method, and device that can change its arbitration decision in real time per packet characteristics. A configurable logic circuit that gets an arbitration decision from a Packet Transfer Arbiter ("PTA"), as well as spectral characteristics of the requested packets of multiple communication devices, and determines whether the spectral separation between the requested transmissions is sufficient to enable high probability of successful concurrent reception of the transmitted packets by the receivers, therefore the packet arbitrator decision to deny ("kill") transmission of one of the requesting transmitters can be overridden and concurrent transmission should be allowed. Known solutions base their arbitration decisions of static information regarding spectral separation between transmitting devices. However, if one or more than the transmitting devices implements a frequency hopping scheme, or any other scheme that results different spectral emission of individual packets, a static mechanism should assume the worst case of spectral separation. For example, a BT device that is hopping between 20 frequencies may not be able to select the whole sequence of hopping channels in frequencies that are out of the spectral bandwidth of its collocated Wi-Fi device, therefore even if interference exists only for one out of 20 frequencies in its hopping sequence, a static arbitration scheme may not allow any concurrency between Wi-Fi and BT transmissions, while in 95% of the transmissions there is no interference between Wi-Fi and BT. Example embodiments disclosed herein provide a mechanism for real time decision based on the spectral characteristics of each transmitted packet, therefore allowing much higher probability of non-interfering concurrent transmissions.

In order to manage communication via multiple radios and avoid collisions and/or interference between respective radios, a dynamic scheduling means can be utilized to coordinate between respective radios that are in collision (e.g., radios configured such that their mutual operation would cause significant interference on at least one of the radios).

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms used in the following description and claims are not limited to their dictionary meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Hereinafter, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
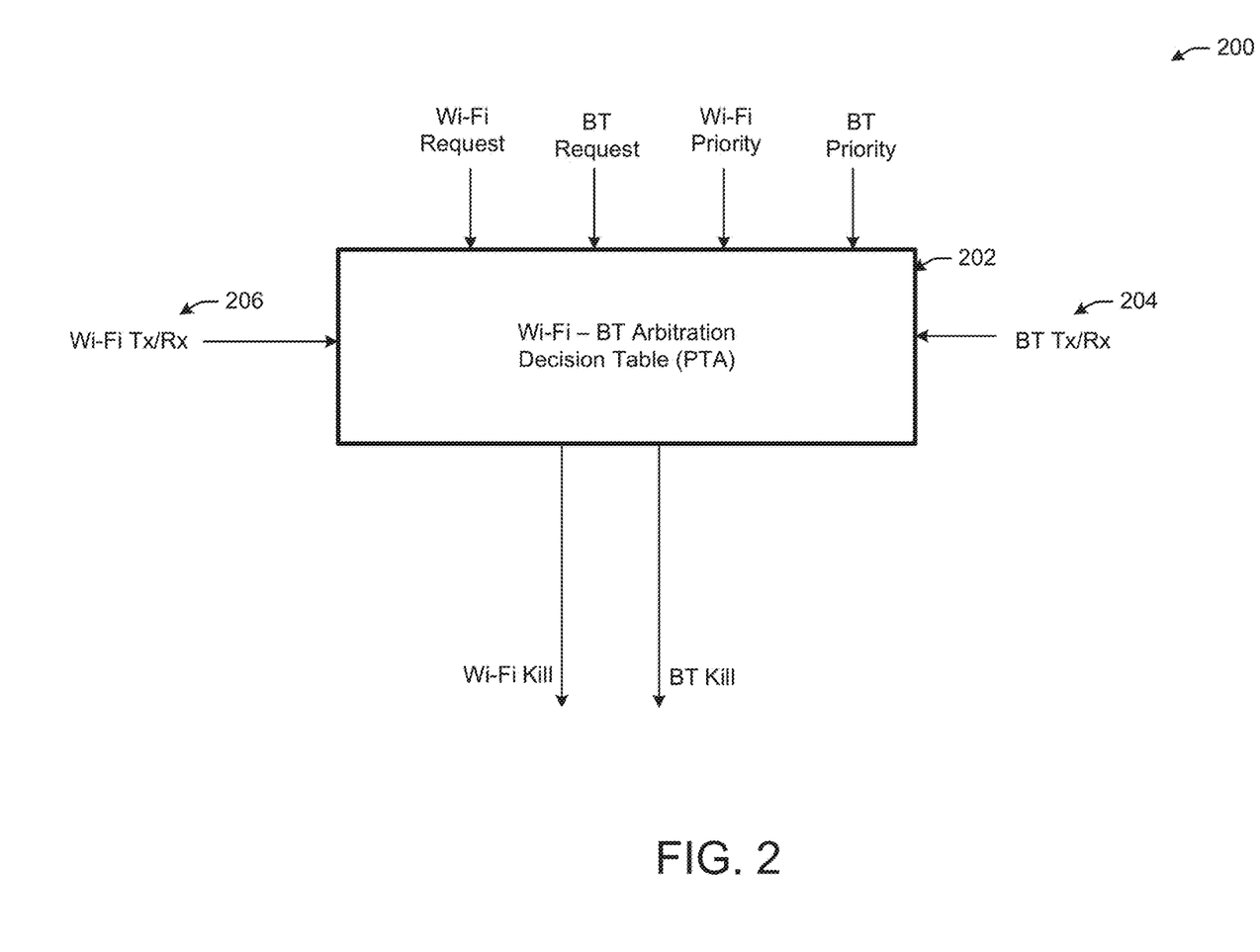
FIG. 2 illustrates architecture of a wireless communication device, according to one exemplary embodiment.

Turning now to FIG. 2, FIG. 2 illustrates a system 200 for implementing fixed reporting time scheme by the Wi-Fi or BT device to increase its visibility, according to one or more example embodiments of the present disclosure. Example Packet Lever Arbiters ("PTAs") 202, such as the one showing in FIG. 2 can be configured to allow one or concurrent transmissions of different communication device when requested or active transmission occurring by two or more communication devices that work in unsynchronized manner. For example, the PTA 202 may receive one or more requests for transmission or reception of one or more Wi-Fi signals 206. Similarly, the PTA 202 may receive one or more requests for transmission or reception of one or more BT signals 204. The arbitration schemes that are described by literature and product documentations are based on predetermined schemes, using priority levels for each active or requested transmission as a criteria for arbitration.

Figure 3:
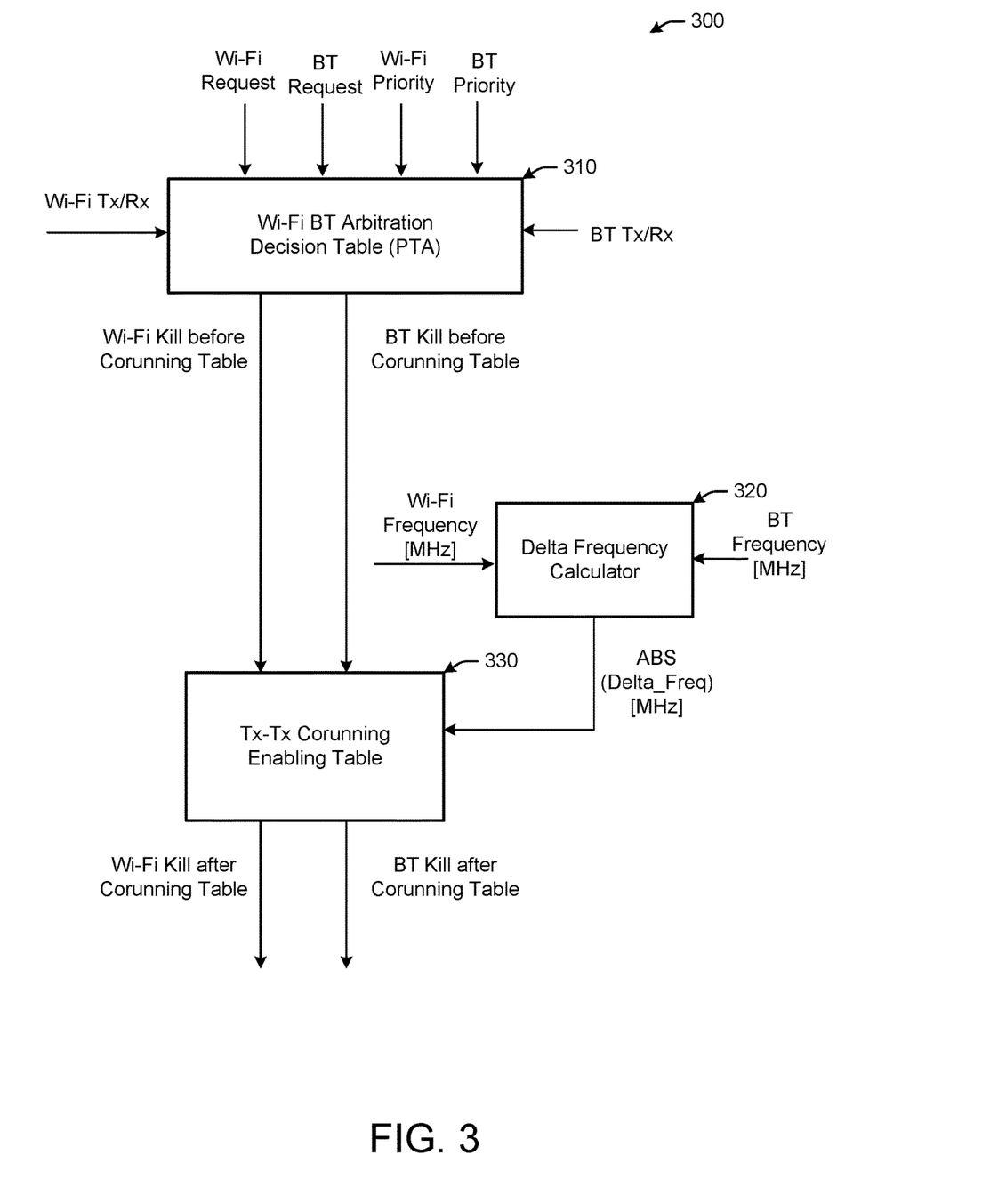
FIG. 3 illustrates an example of a method for processing Wi-Fi and Bluetooth signals, according to one exemplary embodiment.

According to one example embodiment, as shown in FIG. 3, a wireless device architecture 300 may include a dynamic, packet based, inhibition of the arbiter decision to refuse transmission request ("kill") of one or more devices, based upon specific spectral characteristics of the packets. For example, if a Wi-Fi transmitter may be set to transmit in a specific channel in the ISM band (2400-2480 MHz) and utilizing a known spectral mask, while a Bluetooth (BT) device is implementing a spread spectrum frequency hopping sequence, also operating in the ISM band, a portion of the requested transmissions may fall into frequencies that may result low probability of interference to the receiving Wi-Fi device as they fall far enough from the Wi-Fi central frequency that the Wi-Fi receiver is tuned to receive. Accordingly, as shown in FIG. 3, wireless communication device 300 may include a packet arbitration apparatus cascaded with inhibition circuitry for transmission decline ("kill") signals based on spectral separation between communication devices. Device 300 may include a PTA 310, a delta frequency calculator 320, and a Tx-Tx corunning enabling table 330, for example.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Wi-Fi signal from the Wi-Fi device or interface, receive a transmission request for transmitting a Bluetooth signal from the Bluetooth device or interface, determine a delta or difference between a frequency of the Wi-Fi signal and a frequency of the Bluetooth signal, and deny transmission of the Wi-Fi signal or the Bluetooth signal based, at least in part, on the delta determination. The device may also include a packet transfer arbiter for comparing the delta to a threshold value, and denying transmission of the Wi-Fi signal or the Bluetooth signal if the delta is less than the threshold value. The terms delta and difference may be used interchangeably throughout the disclosure. The Bluetooth device or interface and the Wi-Fi device or interface may communicate via a coexistence transport interface, and the Wi-Fi signal can include information including Real Time (RT) and Near Real Time (NRT) messages.

Another example embodiment is a method for dynamic packet transfer in a wireless network, the method including the steps of receiving, by a wireless communication device including one or more processors and one or more memory devices storing computer-executable instructions, a transmission request for transmitting a Wi-Fi signal from a Wi-Fi device or interface, receiving, by the wireless communication device, a reception request for receiving a Bluetooth signal from a Bluetooth device or interface, determining, by the wireless communication device, a delta between a frequency of the Wi-Fi signal and a frequency of the Bluetooth signal, and denying, by the wireless communication device, transmission of the Wi-Fi signal based, at least in part, on the delta determination.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Wi-Fi signal from the Wi-Fi device or interface, receive a reception request for receiving a Bluetooth signal from the Bluetooth device or interface, determine a delta between a frequency of the Wi-Fi signal and a frequency of the Bluetooth signal, and deny transmission of the Wi-Fi signal based, at least in part, on the delta determination. The device may also include a packet transfer arbiter for comparing the delta to a threshold value, and denying transmission of the Wi-Fi signal if the delta is less than the threshold value.

Another example embodiment is a method for dynamic packet transfer in a wireless network, the method including the steps of receiving, by a wireless communication device including one or more processors and one or more memory devices storing computer-executable instructions, a transmission request for transmitting a Bluetooth signal from a Bluetooth device or interface, receiving, by the wireless communication device, a reception request for receiving a Wi-Fi signal from a Wi-Fi device or interface, determining, by the wireless communication device, a delta between a frequency of the Wi-Fi signal and a frequency of the Bluetooth signal, and denying, by the wireless communication device, transmission of the Bluetooth signal based, at least in part, on the delta determination.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Bluetooth signal from the Bluetooth device or interface, receive a reception request for receiving a Wi-Fi signal from the Wi-Fi device or interface, determine a delta between a frequency of the Wi-Fi signal and a frequency of the Bluetooth signal, and deny transmission of the Bluetooth signal based, at least in part, on the delta determination. The device can also include a packet transfer arbiter for comparing the delta to a threshold value, and denying transmission of the Bluetooth signal if the delta is less than the threshold value.

Figure 4:
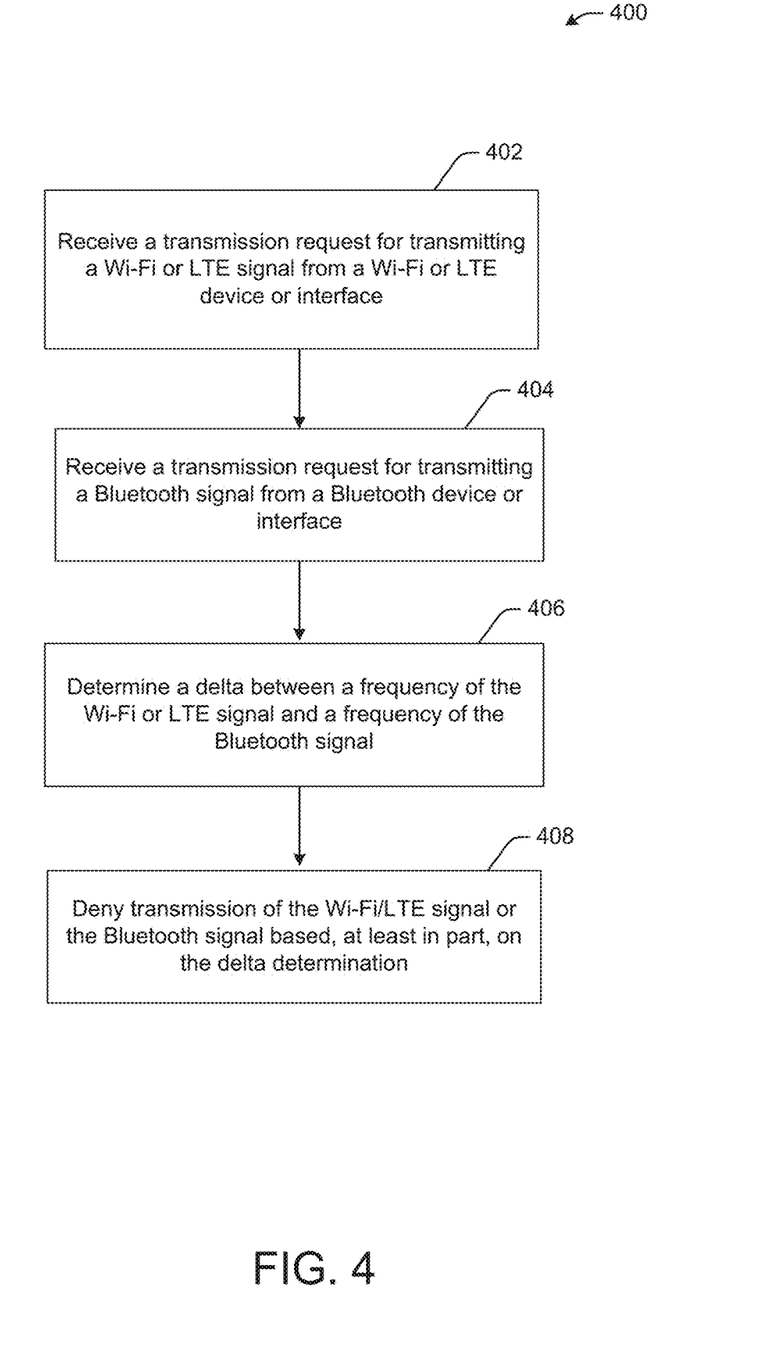
FIG. 4 illustrates an example of a method for dynamic scheduling of Wi-Fi and Bluetooth signals, according to one exemplary embodiment.

FIG. 4 is an example of a flow diagram illustrating a method 400 for processing Wi-Fi and Bluetooth traffic, according to one or more example embodiments of the present disclosure. The method 400 may be stored on a non-transitory computer readable medium and may be executed by a processor within the wireless communication device described in various embodiments disclosed herein. For example, in operation 402, a wireless communication device may receive a transmission request for transmitting a Wi-Fi or LTE signal from a Wi-Fi or LTE device or interface. In operation 404, the wireless communication device may receive a transmission request for transmitting a Bluetooth signal from a Bluetooth device or interface. In operation 406, the wireless communication device may determine a delta between a frequency of the Wi-Fi or LTE signal and a frequency of the Bluetooth signal, and in operation 408, for example, the wireless communication device may deny transmission of the Wi-Fi or LTE signal or the Bluetooth signal based, at least in part, on the delta determination.

In one instance, an LTE uplink signal interferes with a Bluetooth signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

It should be noted that LTE has two variants; Time-Division Duplex (TDD) and Frequency-Division Duplex (FDD). In one instance, where a LTE TDD and Bluetooth are coexistent, the Bluetooth transmission (Tx) may affect LTE downlink (DL) and LTE uplink (UL) may affect Bluetooth reception (Rx). In yet another instance, where a LTE FDD and Bluetooth are coexistent, LTE uplink (UL) may affect Bluetooth Rx, for example.

Figure 5:
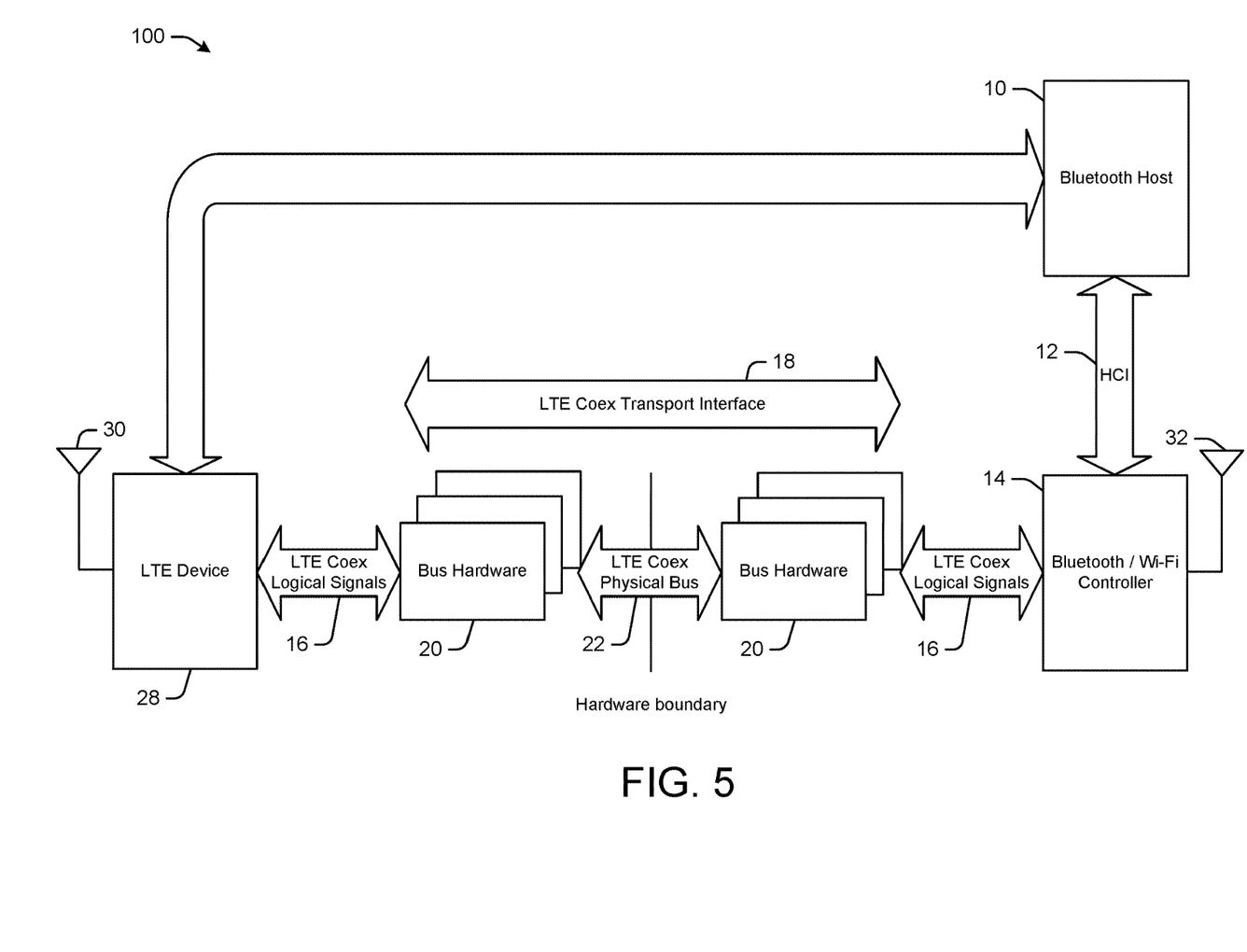
FIG. 5 illustrates steps involved in a method for dynamic scheduling of Wi-Fi and Bluetooth signals, according to one exemplary embodiment.

Turning now to FIG. 5, FIG. 5 illustrates an example embodiment of a wireless communication device 100, according to one aspect of the present disclosure. Device 100 may have the illustrated infrastructure to facilitate a coexistence case including a Mobile Wireless Standards radio 30, such as for example a LTE radio, and a Bluetooth or Wi-Fi radio 32, for example. The collocated Mobile Wireless Standards device 28 and the Bluetooth device or Wi-Fi controller 14 may be configured to exchange one or more real time (RT) traffic messages through a Mobile Wireless Standards (MWS) Coexistence Physical Bus interface 22, for example. One or more messages, as described herein, may include a LTE Tx or a LTE Rx or LTE frame information, which may be transferred from LTE or MWS device 28 to a connectivity chip, for example. According to one or more example embodiments, Bluetooth controller 14 may be configured to indicate high priority traffic to the LTE or MWS device 28 and expect LTE or MWS device 28 to yield in a MWS Coexistence Transport interface 18 in order to avoid conflicts. However, in the case of a Near Real Time (NRT) interface, the messages may be routed through a Bluetooth host interface 10 where status information, such as for example LTE operation band and channels, may be exchanged. Wireless communication device 100 may also include bus hardware 20 to enable communication of MWS Coexistence logical signals 16 between the devices 14, 28 and the MWS Coexistence physical bus 20, for example. Additionally, wireless communication device 100 may include a Host Controller Interface (HCI) architecture, wherein a HCI 12 may enable communication between the Bluetooth host 10 and the Bluetooth controller 14, as shown in FIG. 5, for example. The HCI 12 may, for example, provide a command interface to the baseband controller 14 and Bluetooth host 10, access to configuration parameters, and a uniform method of accessing the Bluetooth baseband capabilities.

The standard interface described above may allow the Mobile Wireless Standards device 28 and the Bluetooth device or controller 14 to exchange information and support cooperative coexistence. However, due to network restriction of the LTE system, in the event there is a conflict or arbitration between the two devices, for example when one device is attempting to send a signal during the reception period of the other device, the system may lean towards the LTE device. Collisions can occur when one interface or device receives a packet while another collocated interface or device is transmitting. Collisions may produce one or more bit errors in the received packet data, corrupted data and packet loss. As such, in a typical scenario, less than 10% of LTE traffic is affected and whenever there is interference between the two devices, Bluetooth device is most likely to be the victim. For example, either the Bluetooth Tx is killed or the Bluetooth Rx gets affected. This may result in, for example, performance degradation due to the wireless communication device 100 attempting multiple retransmissions.

According to one or more example embodiments of the present disclosure, the LTE or MWS device 28 may provide information on its Downlink (DL) and Uplink (UL) activity in advance and may be synchronized with the LTE subframe boundaries DL/UL respectively. The decision point of whether to use the subframe may be done at a fixed time location relative to the subframe boundary. By using the LTE decision point knowledge and knowing the subframe boundary, and LTE frame structure, Bluetooth device 14 may be able to deduce better futuristic information in advance notice time in comparison to the one achieved by only using the knowledge of LTE frame subframe and LTE UL/DL advance indications.

LTE UE may schedule its RF traffic according to eNB's assignments. It may have the knowledge ahead of the actual transmissions, for example. The LTE device may notify its actual traffic with known offsets to other radio devices in the same system, for example. As described herein, the LTE decision point may be a notification point when the LTE device may convey messages, if the traffic state changes, for example. LTE may convey a signal to connectivity chip on the upcoming Tx and Rx traffic, if there is a change. Since the messages only reflect changes, the messages may not be communicated at every notification point.

According to one example embodiment, when LTE device or interface 28 reports its UL and DL activity to the connectivity chip over the RT coexistence interface 18, BT device or interface 14 knows if currently the LTE is in DL or UL and can also calculate internally when a change is expected to happen, for example. The futuristic information can be deduced by the connectivity chip using current information, such as for example, the LTE frame structure (TDD). The LTE frame structure may be semi-static and may be conveyed over a Near Real time (NRT) coexistence interface. However, the LTE subframe time may be fixed, such as for example 1 msec. There may be exceptions in TDD special subframes where the LTE Downlink Pilot Time Slot (DwPTS), Guard Period (GP), or Uplink Pilot Time Slot (UpPTS) times may be fixed, however, may be less than 1 msec.

Futuristic information may also be deduced by the connectivity chip using information, such as for example, LTE DL/UL frame and subframe boundaries information. According to this embodiment, the LTE frame start may be conveyed by the LTE or MWS device 28 to the connectivity chip over the Real Time (RT) coexistence interface 18. LTE subframe boundary may be tracked by the connectivity chip by tracking the time changes of the LTE DL/UL indication over RT coexistence interface 18 and by knowing the subframe time is 1 msec.

According to another example embodiment, futuristic information may be deduced by the connectivity chip using information, such as for example, the LTE decision point or reporting time to the connectivity chip wherein the LTE DL/UL activity reporting point is fixed relative to the subframe boundary. One or more messages transmitted from the LTE or MWS device 28 to the Bluetooth device 14 may carry both static or semi-static traffic information as well as spontaneous traffic information. Static or semi-static information may include, for example, LTE frame structure, LTE traffic pattern and LTE inactivity durations. Together with the Real time signaling of frame_sync, the connectivity chip can derive when some of the traffic may not happen. For example, frame structure message may be able to tell when the UL or the DL will not be happening, and the inactivity duration can indicate the period during which there is no UL and DL.

Figure 6:
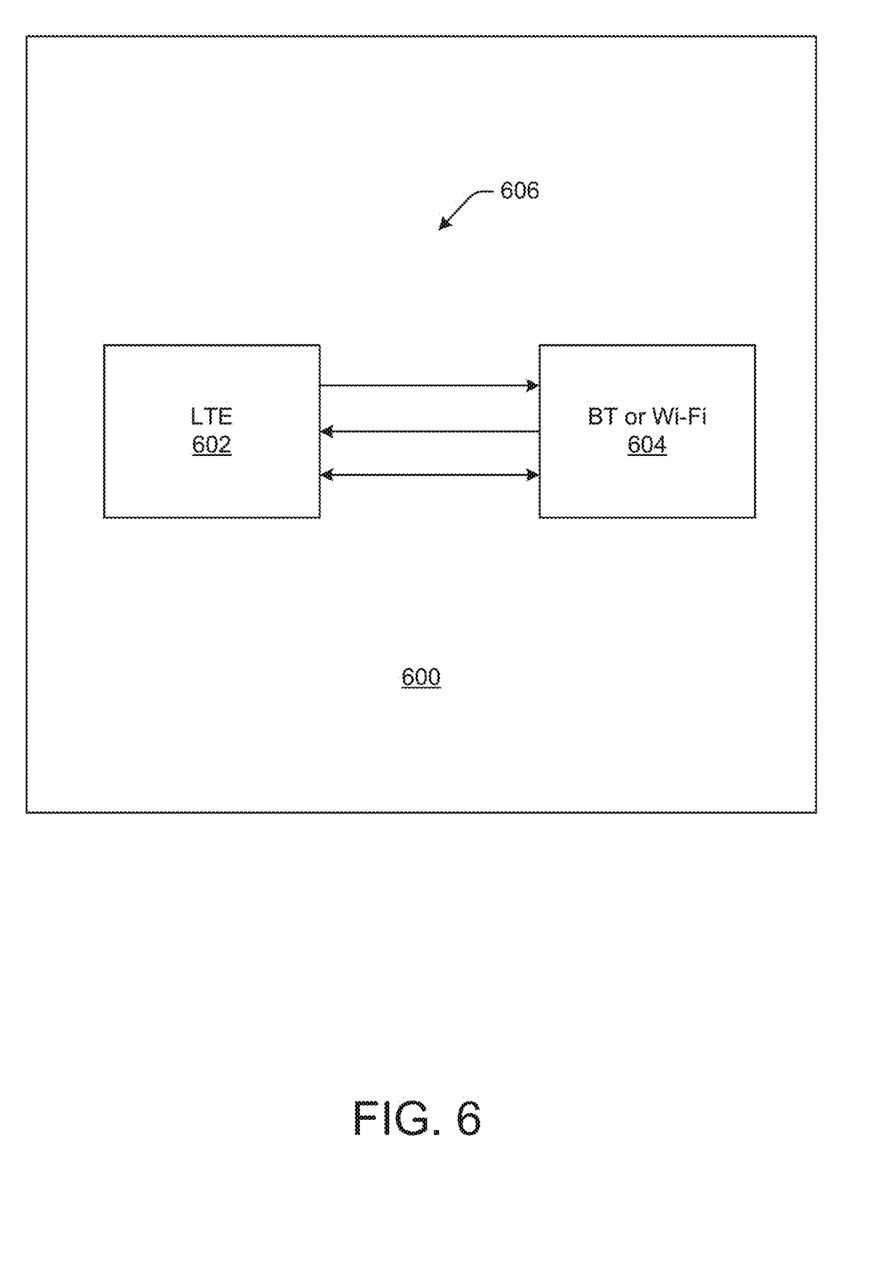
FIG. 6 illustrates an example of a wireless communication device, according to one exemplary embodiment.

Referring to FIG. 6, shown is an example of a wireless communication device (or platform) 600 such as, for example a smart phone, a tablet, a phablet, a personal digital assistant, or other computing device that includes a cellular interface (or device) such as, e.g., Wi-Fi or LTE interface 602 collocated with a Bluetooth interface (or device) 604, according to one or more example embodiments of the present disclosure. The cellular interface (or device) can include processing circuitry capable of supporting cellular communications such as, e.g., LTE, 2G, 3G, 4G, or other cellular communication protocols. For example, the Wi-Fi or LTE interface 602 may include processing circuitry for one or more cellular transceiver(s) to support Wi-Fi or LTE communications. The Bluetooth interface (or device) 604 may include processing circuitry for one or more transceiver(s) to support Bluetooth communications. The communication device 600 may also include additional and/or combined interfaces (or devices) including processing circuitry to support other wireless communications such as, e.g., WLAN, WiMAX, global positioning system (GPS), near field communication (NFC), Neighborhood Area Network (NaN), etc.

In one or more embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions.

High speed signaling 606 may be provided between the Wi-Fi or LTE and Bluetooth interfaces (or devices) 602 and 604. Signaling may also be provided between the other interfaces (or devices) to allow for communications. Examples of the high speed signaling include an LTE frame synchronization (frame_synch) signal that indicates the frame synchronization with the base station, an LTE transmit (Tx) signal that indicates when the LTE interface 602 is or will be transmitting, LTE frame configuration information (e.g., config 0, config 1, config 2, etc.), and other signals and/or information. In some embodiments, the LTE and Bluetooth interfaces 602 and 604 may communicate with each other through, e.g., a two-wire bit pipe interface. The bit pipe interface may be a two-wire high speed universal asynchronous receiver/transmitter (HS_UART) with a baud rate of, e.g., 4 Mbps. Temperature and other operational conditions may also be communicated between the Wi-Fi or LTE and Bluetooth interfaces.

Figure 7:
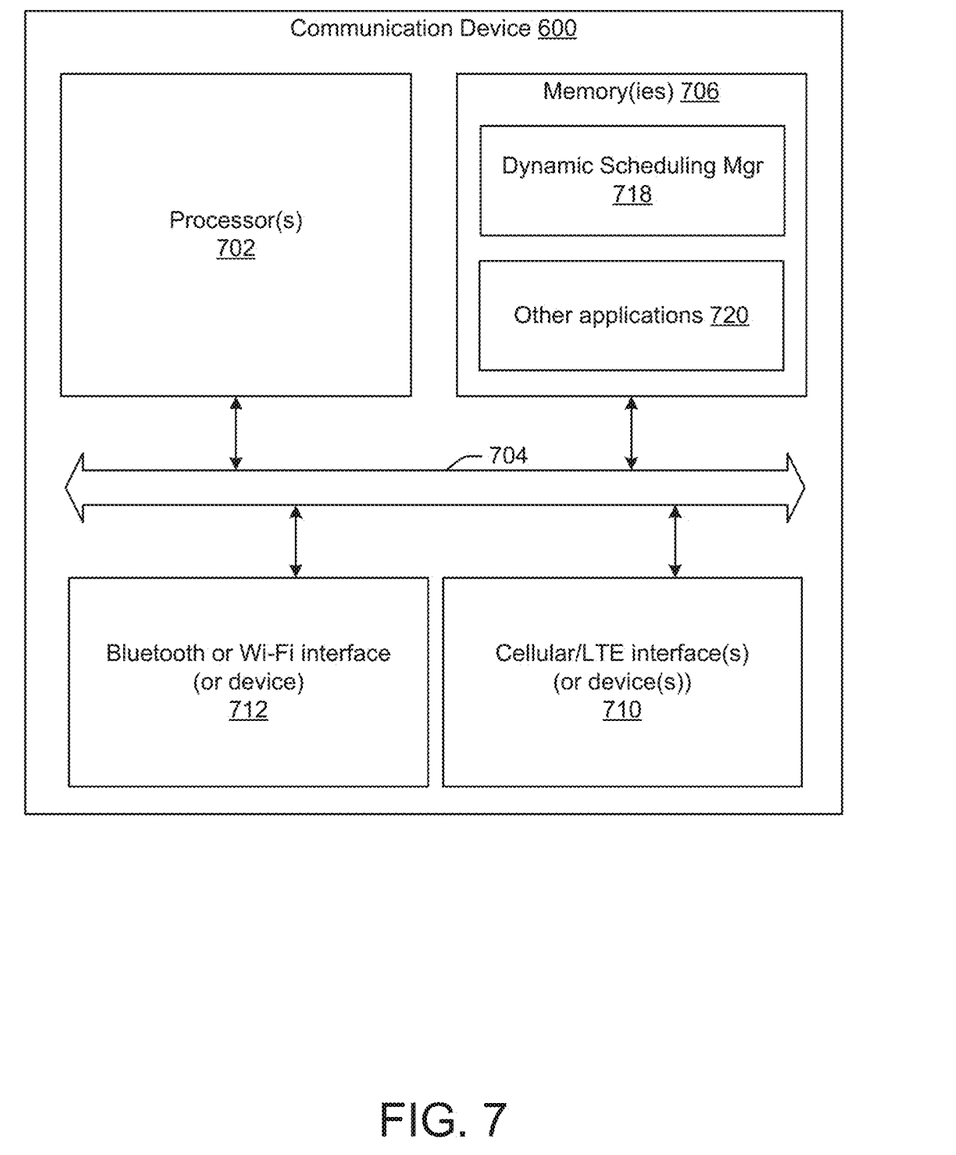
FIG. 7 illustrates an example of a wireless communication device, according to one exemplary embodiment.

Turning now to FIG. 7, shown is a schematic block diagram of the wireless communication device 600 (shown in FIG. 6) in accordance with various embodiments of the present disclosure. The communication device 600 includes at least one processor circuit, for example, having a processor 702 and a memory 706, both of which are coupled to a local interface 704. The communication device 600 may include a cellular interface (or device) 710 such as, e.g., the LTE interface (or device) 602 of FIG. 6 and one or more wireless interface (or device) 712 including, e.g., the Bluetooth interface (or device) 604 of FIG. 6, all of which may be coupled to the local interface 704. The cellular interface (or device) 710 comprises processing circuitry for supporting cellular communications such as, e.g., LTE, 2G, 3G, 4G, WiMAX, WCDMA, HSDPA, WLAN or other wireless communication protocols. The wireless interface(s) (or device(s)) 712 comprise processing circuitry for supporting wireless communications such as, e.g., Bluetooth (Bluetooth), IEEE 802.11a/b/g/n, near field communication (NFC), global positioning system (GPS)/global navigation satellite system (GNSS), neighborhood area network (NaN) and/or other wireless communication protocols.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the cellular interface (or device) 710 and/or wireless interface(s) (or device(s)) 712 may be implemented by processor 702 via local interface 704. The local interface 704 may comprise, for example, a data bus with an accompanying address/control bus or other bus structure as can be appreciated.

Stored in the memory 706 are both data and several components that are executable by the processor 702 and/or by processing circuitry of the cellular interface (or device) 710 and/or wireless interface(s) (or device(s)) 712. In particular, stored in the memory 706 and executable by the processor 702 may be a dynamic scheduling manager 718, and one or more other applications 720. In addition, an operating system may be stored in the memory 706 and executable by the processor 702. In some embodiments, the cellular interface (or device) 710 and/or wireless interface(s) (or device(s)) 712 may include memory for storing the dynamic scheduling manager 718. In some cases, the processor 702 and memory 706 may be integrated as a system-on-a-chip.

It is understood that there may be other applications that are stored in the memory and are executable by the processor 702, the cellular interface (or device) 710 and/or wireless interface(s) (or device(s)) 712 as can be appreciated. A number of software components may be stored in the memory and executable by the processor 702, the cellular interface (or device) 710 and/or wireless interface(s) (or device(s)) 712. In this respect, the term "executable" means a program file that is in a form that can ultimately be run by the processor 702, the cellular interface (or device) 710 and/or wireless interface(s) (or device(s)) 712. Examples of executable programs may be, for example, a compiled program that can be translated into machine code in a format that can be loaded into a random access portion of the memory 706 and run by the processor 702, source code that may be expressed in proper format such as object code that is capable of being loaded into a random access portion of the memory 706 and executed by the processor 702, or source code that may be interpreted by another executable program to generate instructions in a random access portion of the memory 706 to be executed by the processor 702, etc.

An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 702 may represent multiple processors 702 and the memory 706 may represent multiple memories 706 that operate in parallel processing circuits, respectively. In such a case, the local interface 704 may be an appropriate network that facilitates communication between any two of the multiple processors 702, between any processor 702 and any of the memories 706, or between any two of the memories 706, etc. The local interface 704 may comprise additional systems designed to coordinate this communication, including, for example, performing load balancing. The processor 702 may be of electrical or of some other available construction.

Although the dynamic scheduling manager 718, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Based on the foregoing it should be apparent that the exemplary embodiments of this disclosure provide a method, apparatus and computer program(s) to provide enhanced in-device coexistence for a user device that operates with a cellular network, such as the LTE network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Although the flowchart of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dynamic scheduling manager 718 that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example Embodiments

One example embodiment is a method for dynamic packet transfer in a wireless network, the method may include receiving, by a wireless communication device including one or more processors and one or more memory devices storing computer-executable instructions, a transmission request for transmitting a Wi-Fi signal from a Wi-Fi device or interface, receiving, by the wireless communication device, a transmission request for transmitting a Bluetooth signal from a Bluetooth device or interface, determining, by the wireless communication device, a delta between a frequency of the Wi-Fi signal and a frequency of the Bluetooth signal, and denying, by the wireless communication device, transmission of the Wi-Fi signal or the Bluetooth signal based, at least in part, on the delta determination. The method can also include comparing the delta to a threshold value, and denying transmission of the Wi-Fi signal or the Bluetooth signal if the delta is less than the threshold value. The Bluetooth device or interface and the Wi-Fi device or interface may communicate via a Wi-Fi coexistence transport interface, and the Wi-Fi signal can include information including Real Time (RT) and Near Real Time (NRT) messages.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Wi-Fi signal from the Wi-Fi device or interface, receive a transmission request for transmitting a Bluetooth signal from the Bluetooth device or interface, determine a delta between a frequency of the Wi-Fi signal and a frequency of the Bluetooth signal, and deny transmission of the Wi-Fi signal or the Bluetooth signal based, at least in part, on the delta determination. The device may also include a packet transfer arbiter for comparing the delta to a threshold value, and denying transmission of the Wi-Fi signal or the Bluetooth signal if the delta is less than the threshold value. The Bluetooth device or interface and the Wi-Fi device or interface may communicate via a Wi-Fi Coexistence transport interface, and the Wi-Fi signal can include information including Real Time (RT) and Near Real Time (NRT) messages.

Another example embodiment is a non-transitory computer readable medium including instructions stored thereon, which when executed by one or more processor(s) of a wireless communication device, cause the device to perform operations of receiving a transmission request for transmitting a Wi-Fi signal from a Wi-Fi device or interface, receiving a transmission request for transmitting a Bluetooth signal from a Bluetooth device or interface, determining a delta between a frequency of the Wi-Fi signal and a frequency of the Bluetooth signal, and denying transmission of the Wi-Fi signal or the Bluetooth signal based, at least in part, on the delta determination. The processor is also configured to compare the delta to a threshold value, and deny transmission of the Wi-Fi signal or the Bluetooth signal if the delta is less than the threshold value. The Bluetooth device or interface and the Wi-Fi device or interface may communicate via a Wi-Fi Coexistence transport interface, and the Wi-Fi signal can include information including Real Time (RT) and Near Real Time (NRT) messages.

Another example embodiment is a method for dynamic packet transfer in a wireless network, the method including the steps of receiving, by a wireless communication device including one or more processors and one or more memory devices storing computer-executable instructions, a transmission request for transmitting a Wi-Fi signal from a Wi-Fi device or interface, receiving, by the wireless communication device, a reception request for receiving a Bluetooth signal from a Bluetooth device or interface, determining, by the wireless communication device, a delta between a frequency of the Wi-Fi signal and a frequency of the Bluetooth signal, and denying, by the wireless communication device, transmission of the Wi-Fi signal based, at least in part, on the delta determination.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Wi-Fi signal from the Wi-Fi device or interface, receive a reception request for receiving a Bluetooth signal from the Bluetooth device or interface, determine a delta between a frequency of the Wi-Fi signal and a frequency of the Bluetooth signal, and deny transmission of the Wi-Fi signal based, at least in part, on the delta determination. The device may also include a packet transfer arbiter for comparing the delta to a threshold value, and denying transmission of the Wi-Fi signal if the delta is less than the threshold value.

Another example embodiment is a non-transitory computer readable medium including instructions stored thereon, which when executed by one or more processor(s) of a wireless communication device, cause the device to perform operations of receiving a transmission request for transmitting a Wi-Fi signal from a Wi-Fi device or interface, receiving a reception request for receiving a Bluetooth signal from a Bluetooth device or interface, determining a delta between a frequency of the Wi-Fi signal and a frequency of the Bluetooth signal, and denying transmission of the Wi-Fi signal based, at least in part, on the delta determination.

Another example embodiment is a method for dynamic packet transfer in a wireless network, the method including the steps of receiving, by a wireless communication device including one or more processors and one or more memory devices storing computer-executable instructions, a transmission request for transmitting a Bluetooth signal from a Bluetooth device or interface, receiving, by the wireless communication device, a reception request for receiving a Wi-Fi signal from a Wi-Fi device or interface, determining, by the wireless communication device, a delta between a frequency of the Wi-Fi signal and a frequency of the Bluetooth signal, and denying, by the wireless communication device, transmission of the Bluetooth signal based, at least in part, on the delta determination.

Another example embodiment is a wireless communication device including a Wi-Fi device or interface for sending and receiving one or more Wi-Fi signals, a Bluetooth device or interface for sending and receiving one or more Bluetooth signals, at least one memory including computer-executable instructions stored thereon, and one or more processors to execute the computer-executable instructions to receive a transmission request for transmitting a Bluetooth signal from the Bluetooth device or interface, receive a reception request for receiving a Wi-Fi signal from the Wi-Fi device or interface, determine a delta between a frequency of the Wi-Fi signal and a frequency of the Bluetooth signal, and deny transmission of the Bluetooth signal based, at least in part, on the delta determination. The device can also include a packet transfer arbiter for comparing the delta to a threshold value, and denying transmission of the Bluetooth signal if the delta is less than the threshold value.

Another example embodiment is a non-transitory computer readable medium including instructions stored thereon, which when executed by one or more processor(s) of a wireless communication device, cause the device to perform operations of receiving a transmission request for transmitting a Bluetooth signal from a Bluetooth device or interface, receiving a reception request for receiving a Wi-Fi signal from a Wi-Fi device or interface, determining a delta between a frequency of the Wi-Fi signal and a frequency of the Bluetooth signal, and denying transmission of the Bluetooth signal based, at least in part, on the delta determination.

What is claimed is:

1. A wireless communication device, comprising:
    a Wi-Fi device or interface for sending and receiving one or more Wi-Fi signals;
    a Bluetooth device or interface for sending and receiving one or more Bluetooth signals;
    at least one memory comprising computer-executable instructions stored thereon; and
    one or more processors to execute the computer-executable instructions to:

receive a transmission request for transmitting a Wi-Fi signal from the Wi-Fi device or interface;
receive a transmission request for transmitting a Bluetooth signal from the Bluetooth device or interface;
identify a first transmission priority associated with the Wi-Fi signal;
identify a second transmission priority associated with the Bluetooth signal;
receive a packet arbitrator decision to deny transmission of the Wi-Fi signal or the Bluetooth signal based, at least in part, on a comparison of the first transmission priority to the second transmission priority;
determine a delta between a transmission frequency of the Wi-Fi signal and a transmission frequency of the Bluetooth signal;
determine the delta is more than a threshold value; and
override the packet arbitrator decision to deny transmission of the Wi-Fi signal or the Bluetooth signal based, at least in part, on the delta determination being more than the threshold value.

2. The device of claim 1, wherein the one or more processors is further configured to execute the computer-executable instructions to:
compare the delta to a threshold value; and
determine the delta is less than the threshold value.

3. The device of claim 1, wherein the Bluetooth device or interface and the Wi-Fi device or interface communicate via a coexistence transport interface.

4. The device of claim 3, wherein the Wi-Fi signal comprises information including Real Time (RT) and Near Real Time (NRT) messages.

5. The device of claim 1, wherein the one or more processors is further configured to execute the computer-executable instructions to:
receive a second transmission request for transmitting a second Wi-Fi signal from the Wi-Fi device or interface; and
receive a reception request for receiving a second Bluetooth signal from the Bluetooth device or interface.

6. The device of claim 5, wherein the one or more processors is further configured to execute the computer-executable instructions to:
determine a second delta between a frequency of the second Wi-Fi signal and a frequency of the second Bluetooth signal; and
deny transmission of the second Wi-Fi signal based, at least in part, on the second delta determination.

7. The device of claim 1, wherein the one or more processors is further configured to execute the computer-executable instructions to:
receive a second transmission request for transmitting a second Bluetooth signal from the Bluetooth device or interface; and
receive a reception request for receiving a second Wi-Fi signal from the Wi-Fi device or interface;
determine a second delta between a frequency of the second Wi-Fi signal and a frequency of the second Bluetooth signal; and
deny transmission of the second Bluetooth signal based, at least in part, on the second delta determination.

8. A non-transitory computer readable medium including instructions stored thereon, which when executed by one or more processor(s) of a wireless communication device, cause the device to perform operations of:
receiving a transmission request for transmitting a Wi-Fi signal from a first wireless network type;
receiving a transmission request for transmitting a Bluetooth signal from a second wireless network type;
identifying a first transmission priority associated with the Wi-Fi signal;
identifying a second transmission priority associated with the Bluetooth signal;
receiving a packet arbitrator decision denying transmission of the Wi-Fi signal or the Bluetooth signal based, at least in part, on a comparison of the first transmission priority to the second transmission priority;
determining a difference between a transmission frequency of the Wi-Fi signal and a transmission frequency of the Bluetooth signal;
determining the difference is more than a threshold value; and
overriding the packet arbitrator decision denying transmission of the Wi-Fi signal or the Bluetooth signal based, at least in part, on the difference determination being more than the threshold value.

9. The computer readable medium of claim 8, further comprising the operations of:
comparing the difference to a threshold value; and
determining the difference is less than the threshold value.

10. The computer readable medium of claim 8, wherein the first wireless network type is a Wi-Fi device or interface, and the second wireless network type is a Bluetooth device or interface.

11. The computer readable medium of claim 10, wherein the Wi-Fi signal comprises information including Real Time (RT) and Near Real Time (NRT) messages.

12. The computer readable medium of claim 10, further comprising the operations of:
receiving a second transmission request for transmitting a second Wi-Fi signal from the Wi-Fi device or interface; and
receiving a reception request for receiving a second Bluetooth signal from the Bluetooth device or interface.

13. The computer readable medium of claim 12, further comprising the operations of:
determining a second delta between a frequency of the second Wi-Fi signal and a frequency of the second Bluetooth signal; and
denying transmission of the second Wi-Fi signal based, at least in part, on the second delta determination.

14. The computer readable medium of claim 10, further comprising the operations of:
receiving a second transmission request for transmitting a second Bluetooth signal from the Bluetooth device or interface; and
receiving a reception request for receiving a second Wi-Fi signal from the Wi-Fi device or interface;
determining a second delta between a frequency of the second Wi-Fi signal and a frequency of the second Bluetooth signal; and
denying transmission of the second Bluetooth signal based, at least in part, on the second delta determination.

15. A method, comprising:
receiving, by a wireless communication device comprising one or more processors, a transmission request for transmitting a Wi-Fi signal from a Wi-Fi device or interface;
receiving, by the wireless communication device, a transmission request for transmitting a Bluetooth signal from a Bluetooth device or interface;

identifying a first transmission priority associated with the Wi-Fi signal;
identifying a second transmission priority associated with the Bluetooth signal;
receiving a packet arbitrator decision denying transmission of the Wi-Fi signal or the Bluetooth signal based, at least in part, on a comparison of the first transmission priority to the second transmission priority;
determining, by the wireless communication device, a delta between a transmission frequency of the Wi-Fi signal and a transmission frequency of the Bluetooth signal;
determining the delta is more than a threshold value; and
overriding, by the wireless communication device, the packet arbitrator decision denying transmission of the Wi-Fi signal or the Bluetooth signal based, at least in part, on the delta determination being more than the threshold value.

16. The method of claim 15, further comprising:
comparing the delta to a threshold value; and
denying transmission of the Wi-Fi signal or the Bluetooth signal if the delta is less than the threshold value.

17. The method of claim 15, wherein the Bluetooth device or interface and the Wi-Fi device or interface communicate via a coexistence transport interface.

18. The method of claim 15, further comprising:
receiving a second transmission request for transmitting a second Wi-Fi signal from the Wi-Fi device or interface; and
receiving a reception request for receiving a second Bluetooth signal from the Bluetooth device or interface.

19. The method of claim 18, further comprising:
determining a second delta between a frequency of the second Wi-Fi signal and a frequency of the second Bluetooth signal; and
denying transmission of the second Wi-Fi signal based, at least in part, on the second delta determination.

20. The method of claim 15, further comprising:
receiving a second transmission request for transmitting a second Bluetooth signal from the Bluetooth device or interface; and
receiving a reception request for receiving a second Wi-Fi signal from the Wi-Fi device or interface;
determining a second delta between a frequency of the second Wi-Fi signal and a frequency of the second Bluetooth signal; and
denying transmission of the second Bluetooth signal based, at least in part, on the second delta determination.

* * * * *